(12) United States Patent (10) Patent No.: US 8,943,773 B2
Jensen (45) Date of Patent: Feb. 3, 2015

(54) UNIVERSAL JOINT SYSTEM

(75) Inventor: Jerry Jensen, Duvall, WA (US)

(73) Assignee: AGN Universal, LLC, Duvall, WA (US)

( * ) Notice: Subject to any disclaimer, the term of this patent is extended or adjusted under 35 U.S.C. 154(b) by 248 days.

(21) Appl. No.: 13/567,996

(22) Filed: Aug. 6, 2012

(65) Prior Publication Data

US 2013/0202348 A1 Aug. 8, 2013

Related U.S. Application Data

(60) Provisional application No. 61/515,270, filed on Aug. 4, 2011.

(51) Int. Cl.
*E04B 1/62* (2006.01)
*E04F 15/14* (2006.01)
*E04F 15/22* (2006.01)
*F16B 5/00* (2006.01)
*E04B 1/68* (2006.01)

(52) U.S. Cl.
CPC .. *F16B 5/00* (2013.01); *E04B 1/681* (2013.01)
USPC ................... 52/395; 52/394; 52/461; 52/472; 52/417; 52/442; 52/396.07; 52/468; 52/716.1; 52/717.05; 52/717.03

(58) Field of Classification Search
USPC ........... 52/393, 395, 394, 459, 461, 417, 442, 52/396.1, 396.03, 396.04, 396.08, 396.07, 52/468, 471, 288.1, 716.1, 716.2, 717.05, 52/717.03, 204.593, 204.62, 204.71, 52/588.1, 582.1; 404/69, 49; 403/335
See application file for complete search history.

(56) References Cited

U.S. PATENT DOCUMENTS

| | | | | |
|---|---|---|---|---|
| 3,455,215 A * | 7/1969 | Webb | ............................. | 404/69 |
| 3,667,174 A * | 6/1972 | Arnett | ............................ | 52/100 |
| 3,688,460 A * | 9/1972 | Van Loghem et al. | .......... | 52/466 |
| 4,222,210 A * | 9/1980 | Hanstein et al. | ................ | 52/461 |
| 4,292,774 A * | 10/1981 | Mairle | ............................ | 52/208 |
| 4,400,925 A * | 8/1983 | Van Loghem et al. | .......... | 52/471 |
| 4,669,245 A * | 6/1987 | Lucas | ............................. | 52/370 |
| 5,365,713 A * | 11/1994 | Nicholas et al. | ............. | 52/573.1 |
| 5,687,524 A * | 11/1997 | Ting | ............................... | 52/461 |
| 6,023,899 A * | 2/2000 | Mecozzi | .................... | 52/396.04 |
| 6,588,165 B1 * | 7/2003 | Wright | ....................... | 52/506.05 |

* cited by examiner

*Primary Examiner* — Chi Q Nguyen
(74) *Attorney, Agent, or Firm* — Michael J. Donohue; Davis Wright Tremaine LLP

(57) ABSTRACT

A universal joint system, to be used in construction, for joining two or more cladding materials together. The joint system is configured to replace conventional caulks joints prone to failure due to short UV longevity or improper installation conditions. The joint system is comprises interlocking extrusions and rubber gasket extrusions along with supportive components. The joint system is configurable for both vertical and horizontal installations and can be used with any substrate finishes.

29 Claims, 16 Drawing Sheets

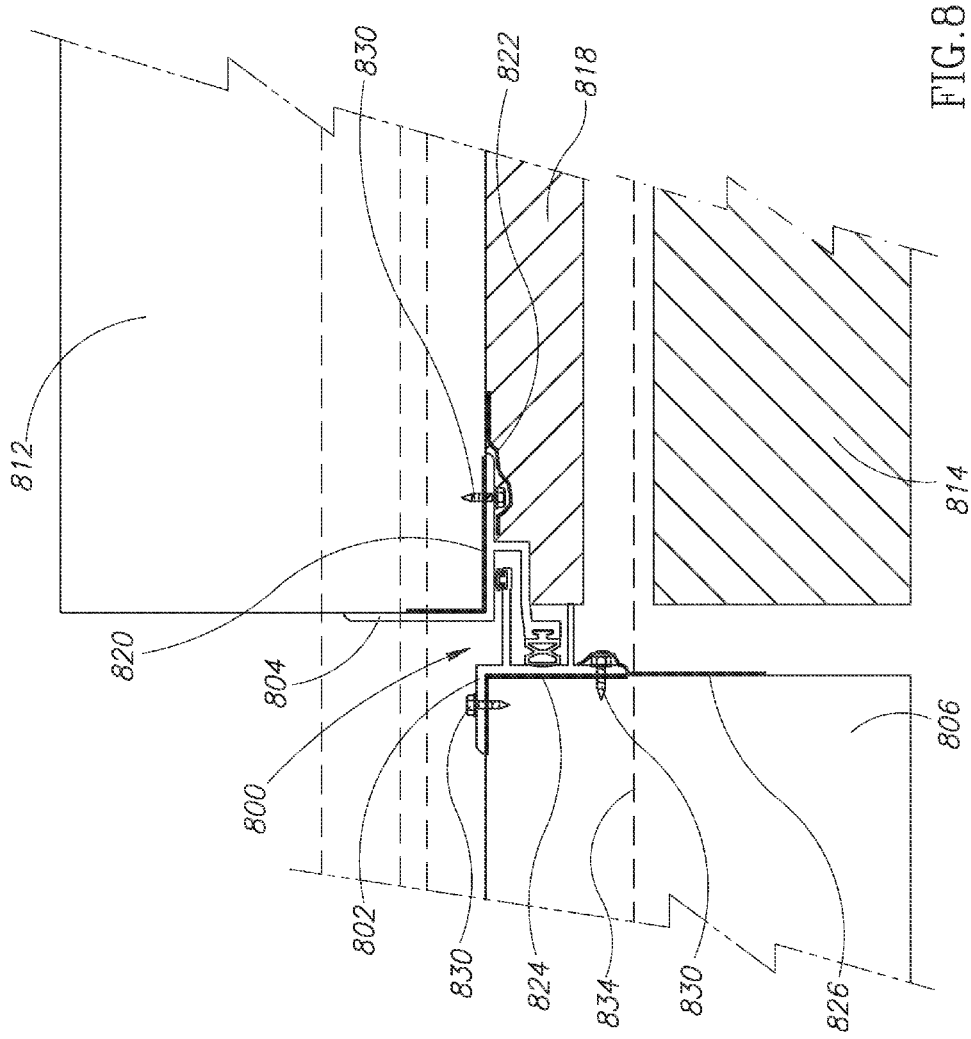

UNIVERSAL JOINT SYSTEM

CROSS REFERENCE TO RELATED APPLICATION(S)

This application claims the benefit of U.S. Provisional Patent Application No. 61/515,270, filed Aug. 4, 2011, entitled "Universal Joint System."

BACKGROUND OF THE INVENTION

1. Field of the Invention

The present invention is directed generally to systems and methods of construction, and more specifically, to systems and methods for adhering and sealing joints between adjoining materials.

2. Description of the Related Art

In the construction of homes, building, or other structures, it is common to use sealants or caulk to adhere one or more joints together. The term "caulk" is often referred to as one of the common chemical sealants made from silicone, polyurethane, polysulfide, or acrylic. Other types of chemical sealants are also used in construction to seal joints between adjoining materials.

Different caulks can be used based on the adjoining materials of the joints being sealed. For example, construction caulk is often heavier and used in building construction where no movement is expected. Various caulks are used in joints where movement is expected or other environmental factors need to be considered. Examples of such environmental factors include precipitation, dry climates, or extreme hot and cold temperatures.

Caulks and sealants are generally provided in tubes having a narrow nozzle at one end. A caulking gun is used to apply the caulk or sealant in the joint between two materials. Once applied, there is a curing time for the sealant to properly fill and secure the joint.

While a variety of caulks have been developed that provide specific advantages for various substrate types and environments, it is still common to experience failure over time. Adhesive failure between the caulk and the substrates can occur for a variety of reasons. The most common reasons are substrate movement, caulk shrinkage, improper application on a damp surface, and improper application during non-optimal environmental conditions.

Some systems provide a solution for limiting the problems of adhesive failure through use of a backer rod placed in the joint between two substrates. The backer rod operates to limit the amount of caulk or sealant required, thereby reducing the stress on the caulk-to-substrate bond. However, this approach merely reduces the stress and will eventually fail by one or more of the other conditions described above.

FIG. 1 is an elevational sectional view of a poor caulk joint 104 comprising caulk 105 between two substrates 100 and 110. Excessive thickness of the caulk 105 makes it difficult to stretch, leading to failure of the bond between the caulk and substrates 100 and 110. Common types of sealant and caulk failure are adhesive failure or cohesive failure due to chemical degradation. Adhesive failure is caused by one of: movement between the substrates, caulk shrinkage, improper application, or improper environment.

FIG. 2 is an elevational sectional view of a caulk joint 204 comprising caulk 205 and a backer rod 207 disposed between two adjacent substrates 200 and 210. To limit the amount of caulk 205 required to seal the joint 204, the backer rod 207 is used. In general, the use of the backer rod 207 reduces the thickness of the joint 204 so that the caulk 205 stretches easier and less caulk is required to fill the joint. The use of the backer rod 207 also minimizes bonding stress between the caulk 205 and the substrates 200 and 210.

FIGS. 3A-3D illustrate various types of fractures that can occur between two substrates that are adhered to each other using caulk. Specifically, FIG. 3A is sectional view of a top substrate 300 and a bottom substrate 310 that are adhered to each other using caulk 301. As illustrated, a cohesive fracture 312 occurs within the caulk 301 but does not directly affect the interfaces of the two substrates 300 and 310. FIG. 3B is a sectional view of an adhesive or "interfacial" fracture 314 between the substrates 300 and 310. As illustrated, adhesive fractures in the caulk 301 occur along one or more interfaces (e.g., interface 302 of the substrate 310) of the substrates 300 and 310. Adhesive fractures are also known as interfacial fractures. FIG. 3C is a sectional view of a fracture 316 in the caulk 301 that "jumps" between the adhered substrates 300 and 310. As illustrated, fracture jumping occurs in the caulk 301 by retracting from the interfaces of both of the substrates 300 and 310. FIG. 3D is a sectional view of a fracture 318 in the substrate 300. As illustrated, the fracture 318 in the substrate 300 causes a fracture 320 in the caulk 301 and the interface of the substrate 300. Fractures and degradation in caulk and sealants are not limited to those illustrated in FIGS. 3A-3D. Environmental conditions and improper application can lead to various types of separation from substrate interfaces.

BRIEF DESCRIPTION OF THE SEVERAL VIEWS OF THE DRAWINGS

FIG. 8 is a top plan view of another embodiment of a vertical panel joint having a forward facing flange male extrusion and a rear facing flange female extrusion.

DETAILED DESCRIPTION OF THE INVENTION

Embodiments of the present invention are directed to systems and methods for providing joint systems that can be used with multiple types of substrates and finishes (or "cladding"). In some embodiments, the "universal" joint systems described herein are comprised of aluminum extrusions and rubber gasket extrusions along with supportive components. Although the term "extrusion" is used throughout, it will be appreciated that the components of the present invention may be formed using any suitable process. The joint systems may be used to replace or work in conjunction with commonly used caulk joints that are prone to failure due to short ultraviolet (UV) longevity, variable environmental conditions present at the time of installation, or other causes. The joint systems may be used to adjoin panels constructed from the same or different materials (e.g., concrete, glass, metal, etc.).

As discussed in detail below, the joint systems include various vertical joint configurations that have interlocking female and male extrusions configured to adjoin vertical edges of two materials. The vertical extrusions forming a vertical panel joint comprise mounting flanges, a female pocket, a movement compensation gasket, an air seal extension, and a receiver or shield flange.

The joint systems also include various horizontal drainage joint configurations that have interlocking aluminum "h-extrusions" and "T-stop extrusions." The horizontal extrusions forming the horizontal drainage joints comprise mounting flanges, a female pocket, an exterior facing flange, gaskets, and an exterior facing drainage flange. The universal joint systems described herein may also be configured for dynamic building movement requirements.

Figure 1:
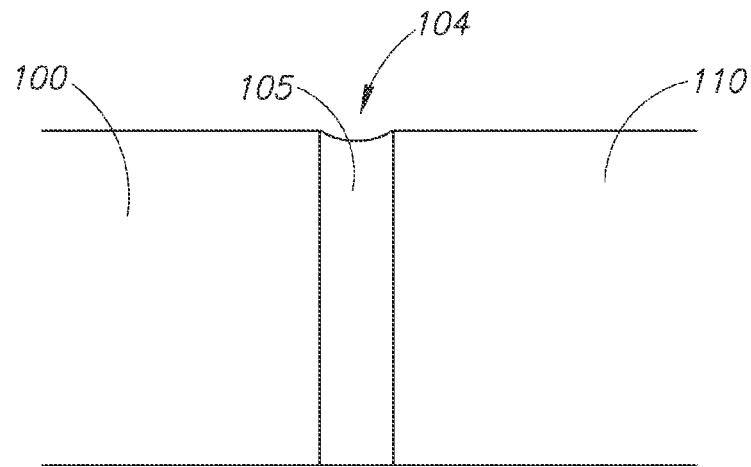
FIG. 1 is a sectional view of a prior art caulk joint.
Figure 2:
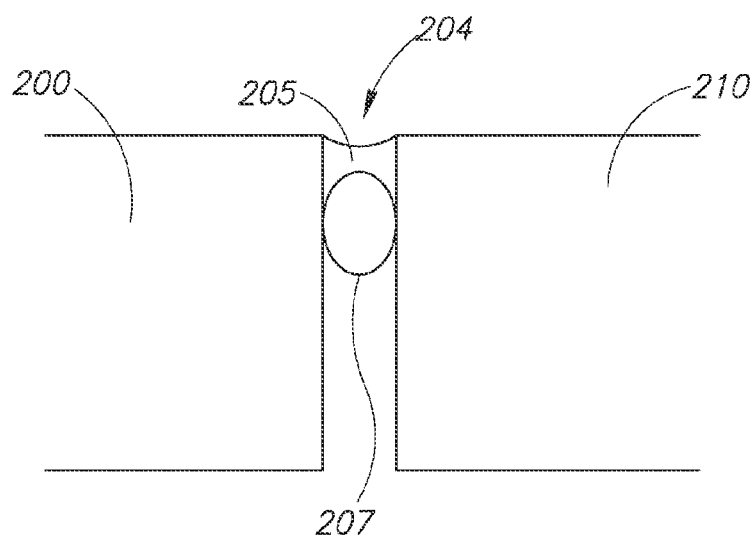
FIG. 2 is a sectional view of a prior art caulk joint that includes a backer rod.
Figure 3A:
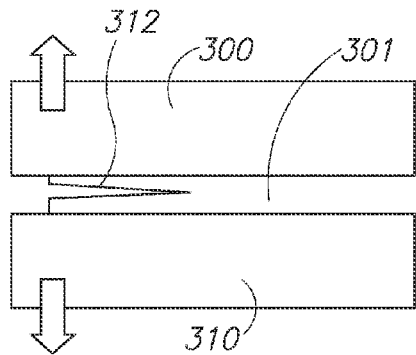
FIG. 3A is a sectional view of a cohesive fracture between two substrates adhered using a prior art caulk joint.
Figure 3B:
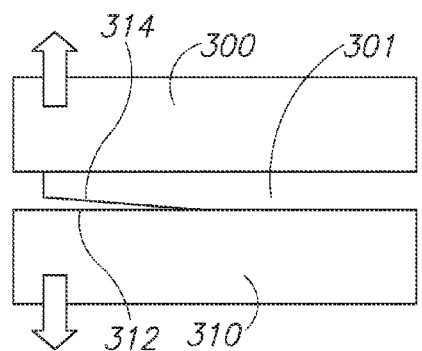
FIG. 3B is a sectional view of an adhesive fracture between two substrates adhered using a prior art caulk joint.
Figure 3C:
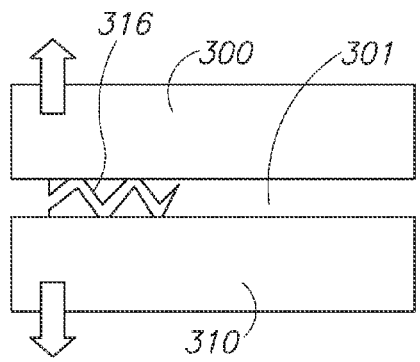
FIG. 3C is a sectional view of fracture that jumps between two substrates adhered using a prior art caulk joint.
Figure 3D:
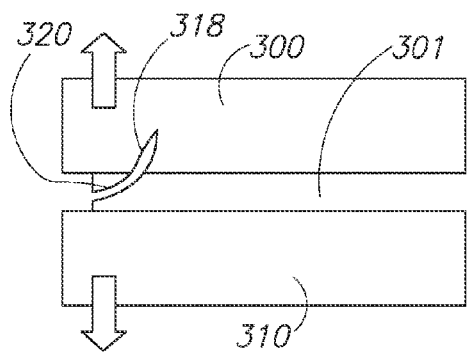
FIG. 3D is a sectional view of a fracture in one of two substrates adhered using a prior art caulk joint.
Figure 4:
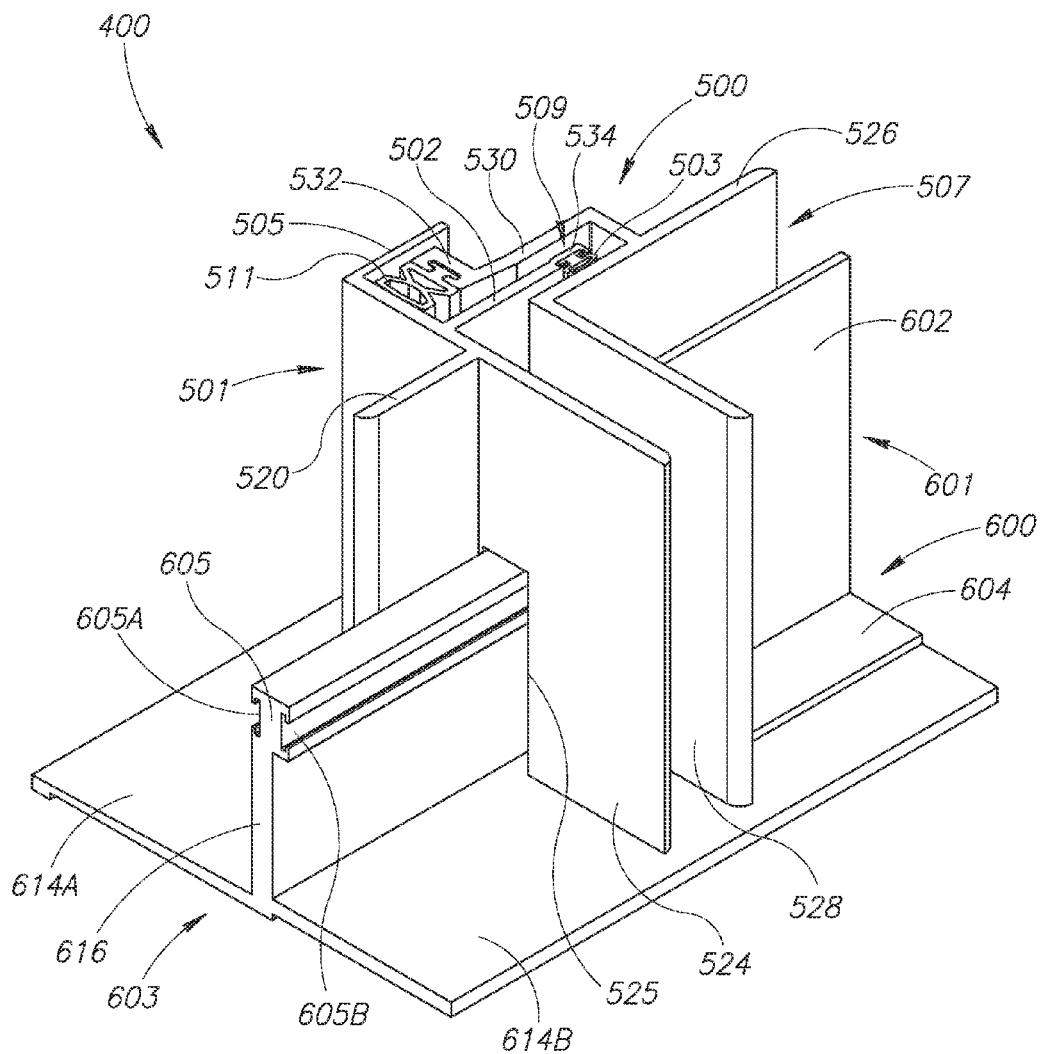
FIG. 4 is a back perspective view of an interlocking vertical panel joint and horizontal panel or drainage joint according to an embodiment of the present invention that are configured for connecting two substrates.

FIG. 4 is a stand-alone perspective view of universal joint system 400 comprising a vertical panel joint 500 interlocking with a horizontal panel or drainage joint 600. In FIG. 4, the cladding panels to which the components of the joint system 400 would be attached are not shown for clarity. Further, only a portion of the horizontal panel joint 600 is shown for clarity. Various views of the vertical panel joint 500 are shown in FIGS. 5A-5D, and various views of the horizontal panel joint 600 are shown in FIGS. 6A-6D. In one embodiment, the joint system 400 is comprised of aluminum extrusions and rubber gasket extrusions. The use of aluminum and rubber allow the joint system 400 to be installed in any weather conditions without compromising the seal.

Figure 5A:
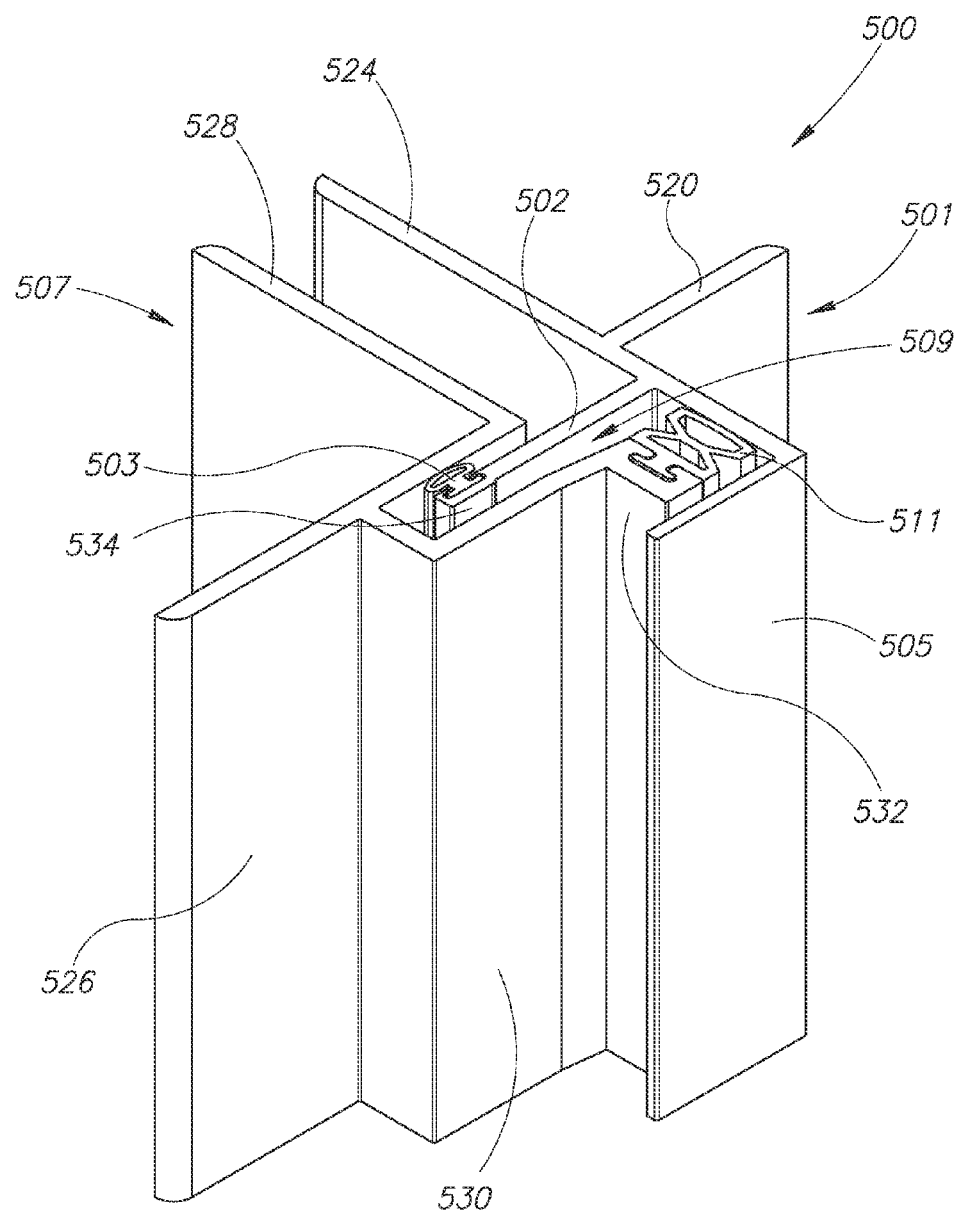
FIG. 5A is a front perspective view of the vertical panel joint shown in FIG. 4.
Figure 5B:
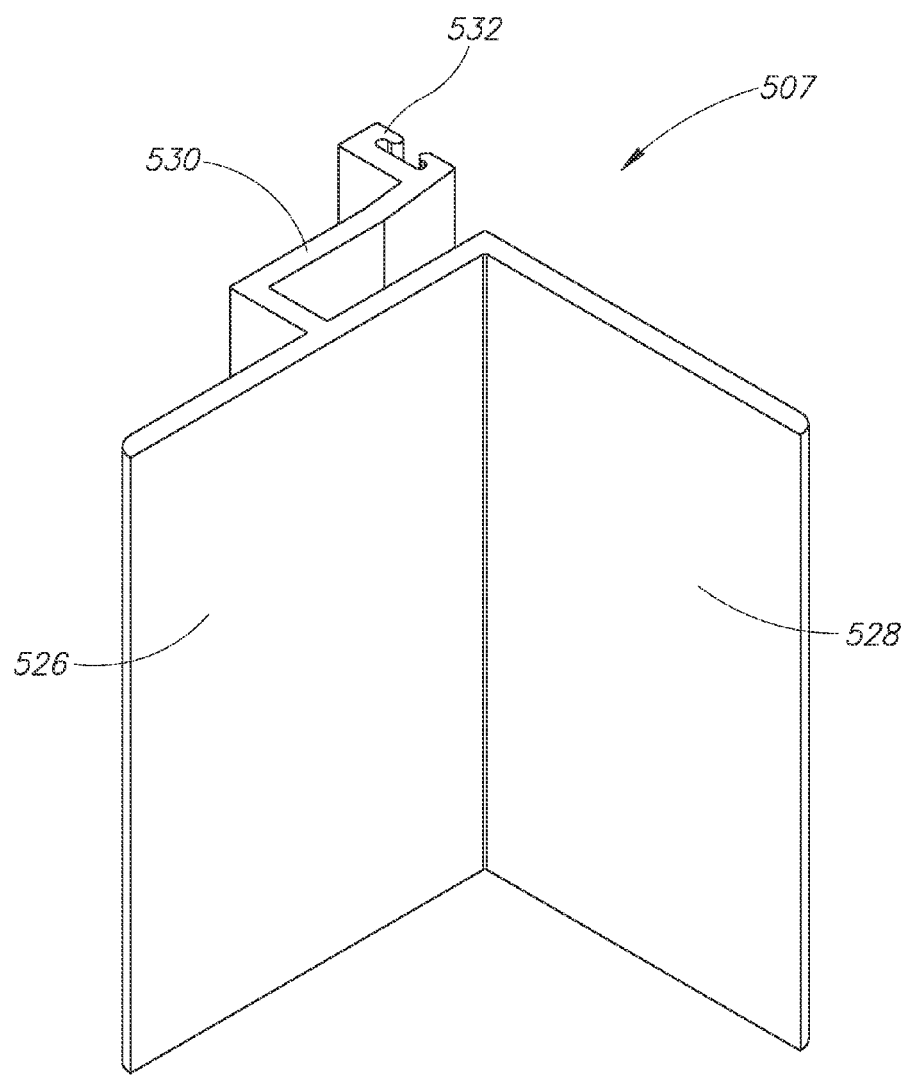
FIG. 5B is a back perspective view of a female extrusion of the vertical panel joint shown in FIG. 5A.
Figure 5C:
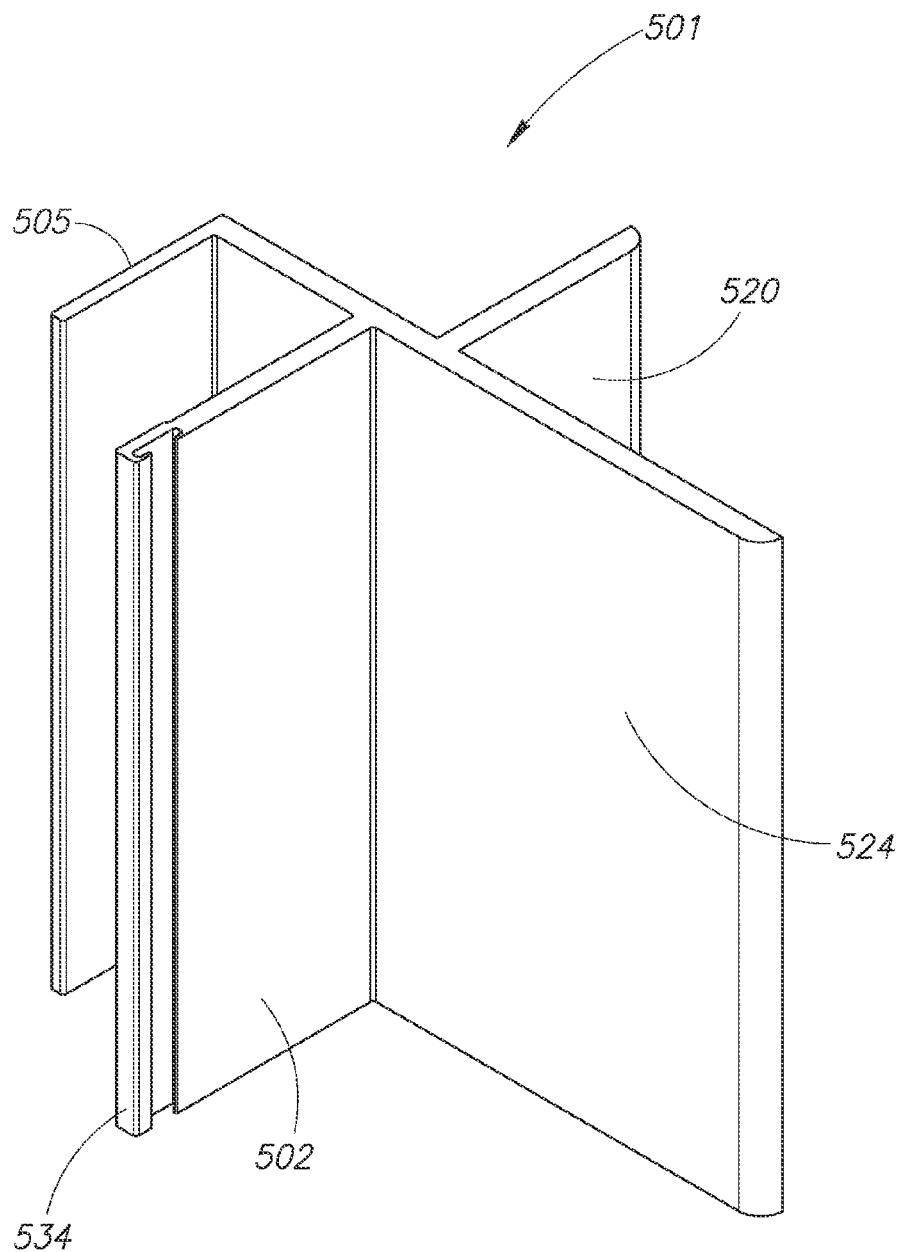
FIG. 5C is a back perspective view of a male extrusion of the vertical panel joint shown in FIG. 5A.
Figure 5D:
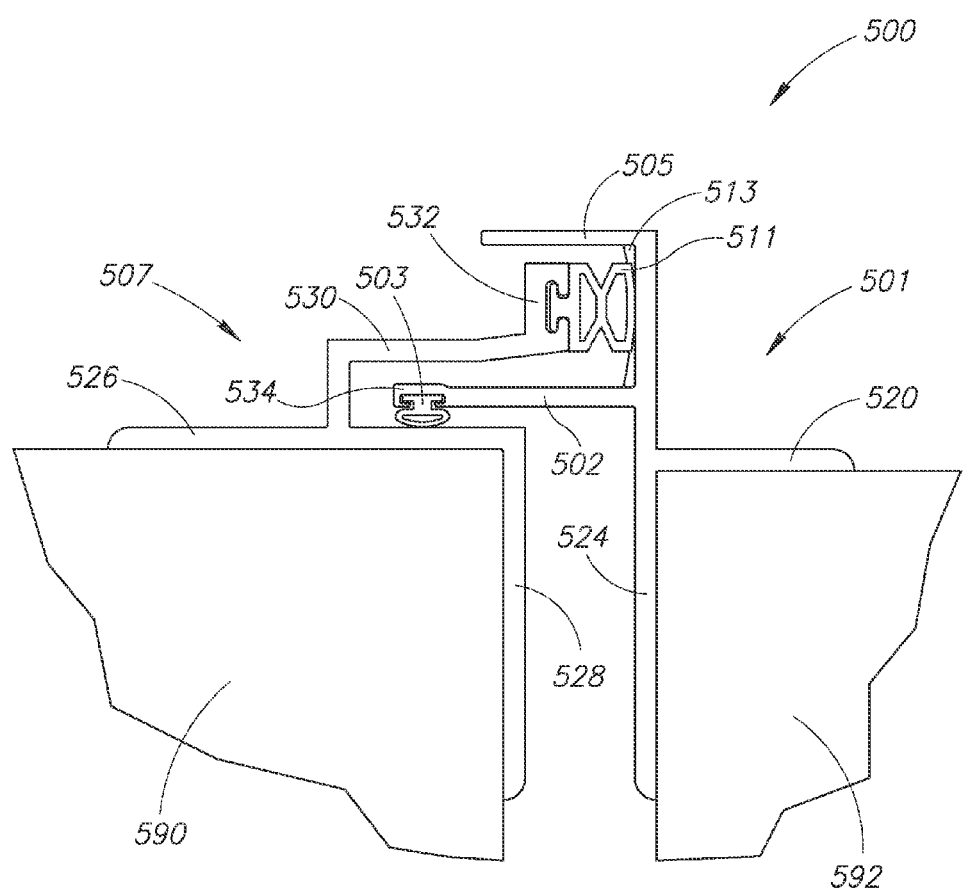
FIG. 5D is a top plan view of the vertical panel joint shown in FIG. 5A.

FIG. 5A is a rear perspective view of the vertical panel joint 500 also shown in FIG. 4. As illustrated, the vertical panel joint 500 is shown in a forward facing configuration, but it may also be modified for use in centered and rear facing configurations (see FIGS. 7A-7G). The vertical panel joint 500 comprises a male extrusion 501 that interlocks with a female extrusion 507. The male extrusion 501 comprises a front mounting flange 520 and a rear mounting flange 524 configured to mount the male extrusion to an exterior cladding platform 592 (see FIG. 5D). Similarly, the female extrusion 507 comprises a front mounting flange 526 and a rear mounting flange 528 configured to mount the female extrusion to an exterior cladding platform 590. The extrusions 501 and 507 may be mounted to the cladding 592 and 590, respectively, using any suitable technique, including anchors, adhesives, etc. The male extrusion 501 comprises an air-sealing extension arm 502 having a gasket engagement portion 534 disposed at the free end thereof. A "D" shaped wiper seal 503 is coupled to the gasket engagement portion 534 and is configured for air sealing to prevent water from being drawn through the vertical joint 500. The male extrusion 501 also comprises a receiver or shield flange 505 that covers a rain-screen gasket 511 of the female extrusion 507 when the male extrusion is in a linked position with the female extrusion as shown in FIGS. 5A and 5D. In some embodiments, the male extrusion 501 is constructed using aluminum, but other materials may also be used.

The female extrusion 507 comprises a female pocket 509 formed between the front mounting flange 526 and a rain-screen gasket extension arm 530. The female pocket 509 is configured to receive the air-sealing extension arm 502 of the male extrusion 501 when the extrusions 501 and 507 are interlocked with each other. As discussed above, the female extrusion 507 comprises the rain-screen gasket extension arm 530 having a gasket engagement portion 532 disposed on the free end thereof that retains the movement compensating rain-screen gasket 511. The rain-screen gasket 511 provides an initial seal behind the receiver or shield flange 505 of the male extrusion 501. In some embodiments, the female extrusion 507 is constructed using aluminum, but other materials may be used.

In some embodiments, a sealant 513 may be placed in the female pocket 509 to provide additional sealing capabilities (see FIG. 5D). As an example, a butyl sealant may be used. In some embodiments, the sealant 513 comprises DOW CORNING® 111 Valve Lube Sealant, but other types of sealants may also be used.

Figure 6A:
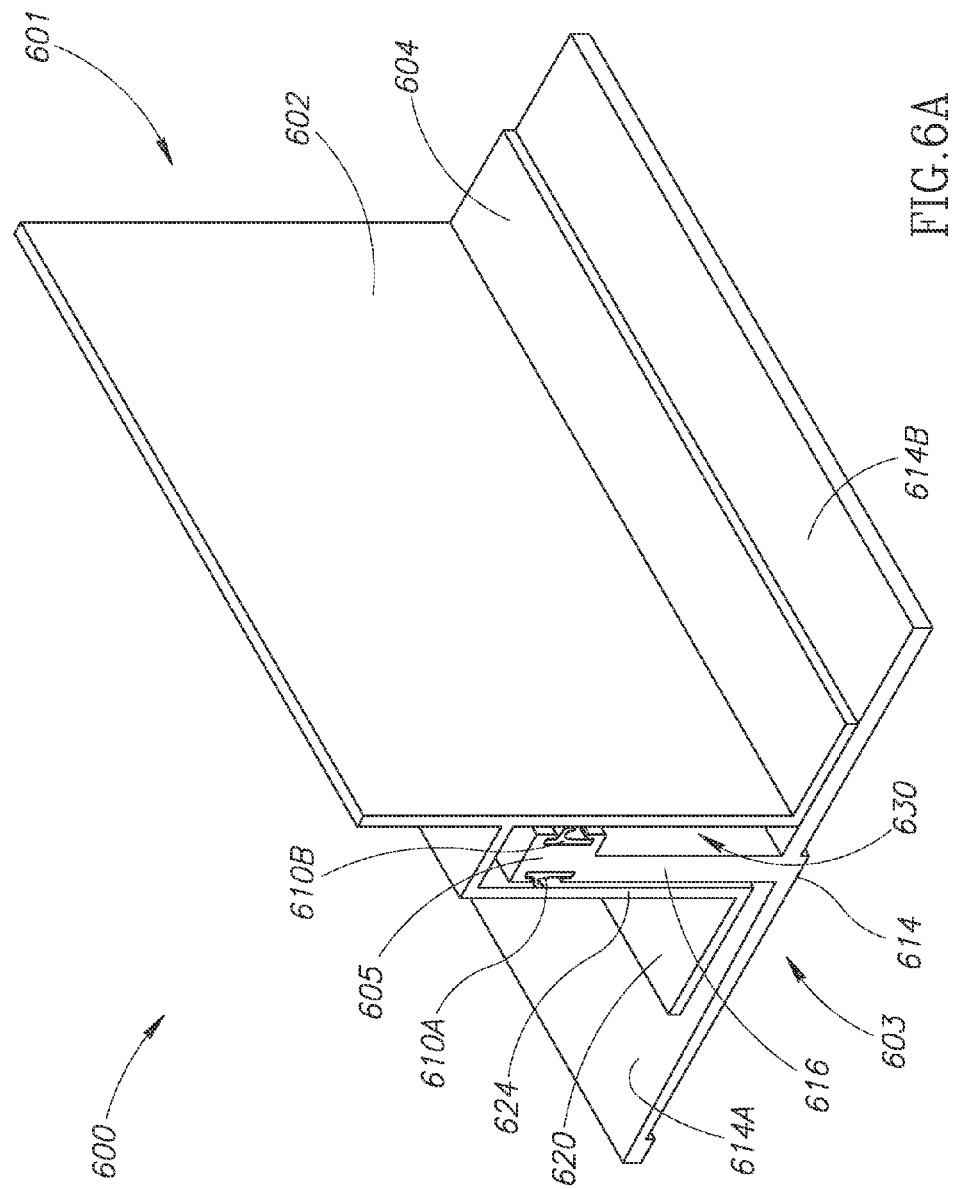
FIG. 6A is a perspective view of the horizontal panel joint shown in FIG. 4.
Figure 6B:
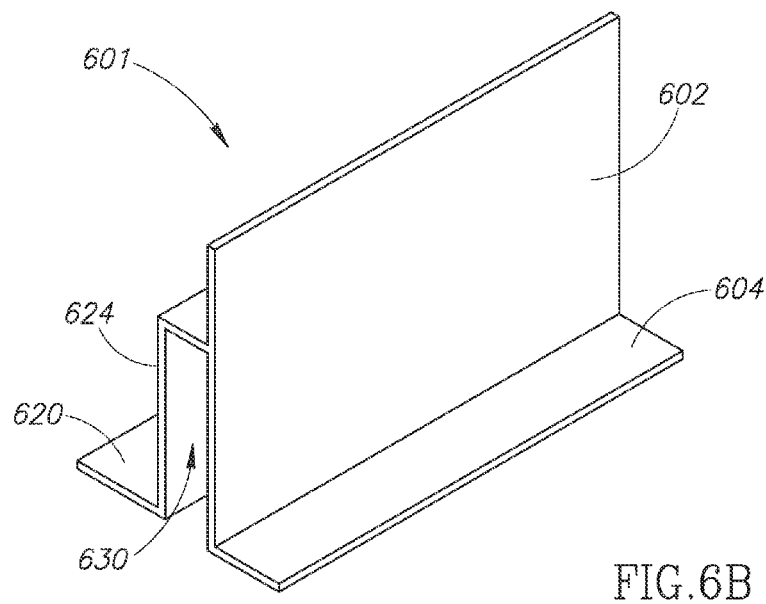
FIG. 6B is a perspective view of an h-shaped extrusion of the horizontal panel joint shown in FIG. 6A.
Figure 6C:
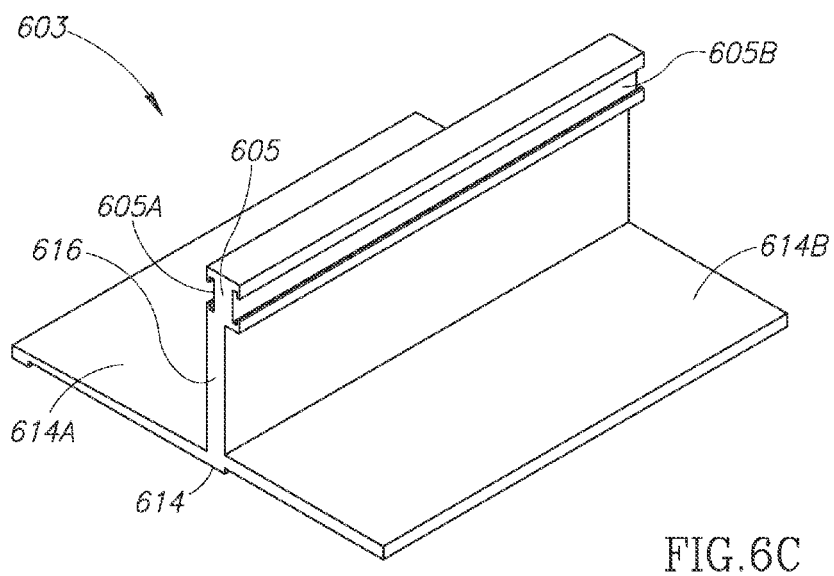
FIG. 6C is a perspective view of a T-stop extrusion of the horizontal panel joint shown in FIG. 6A.

FIG. 6A is a perspective view of the horizontal panel or drainage joint 600 of the joint system 400 shown in FIG. 4. The horizontal drainage joint 600 comprises an h-shaped extrusion (or "h-extrusion") 601 having a downward facing female pocket 630 and a T-shaped extrusion (or "T-stop extrusion") 603 having vertical male extension 616 configured for interlocking with the female pocket 630. In some embodiments, both extrusions 601 and 603 are constructed from aluminum. The female extrusion 601 with the female pocket 630 includes mounting or casting flanges 602 and 604 configured to mount the extrusion to adjoining exterior cladding platform (see FIG. 6D). In some embodiments, the female extrusion 601 may be integrated or pre-formed into the bottom edge of a panel of cladding. The female pocket 630 is formed between the vertical mounting flange 602 and a vertical exterior pocket flange 624. The female extrusion 601 also has an exterior facing horizontal flange 620 extending outward from the exterior pocket flange 624 for directing water outward toward the exterior. The female extrusion 601 is shown in isolation in FIG. 6B.

Figure 6D:
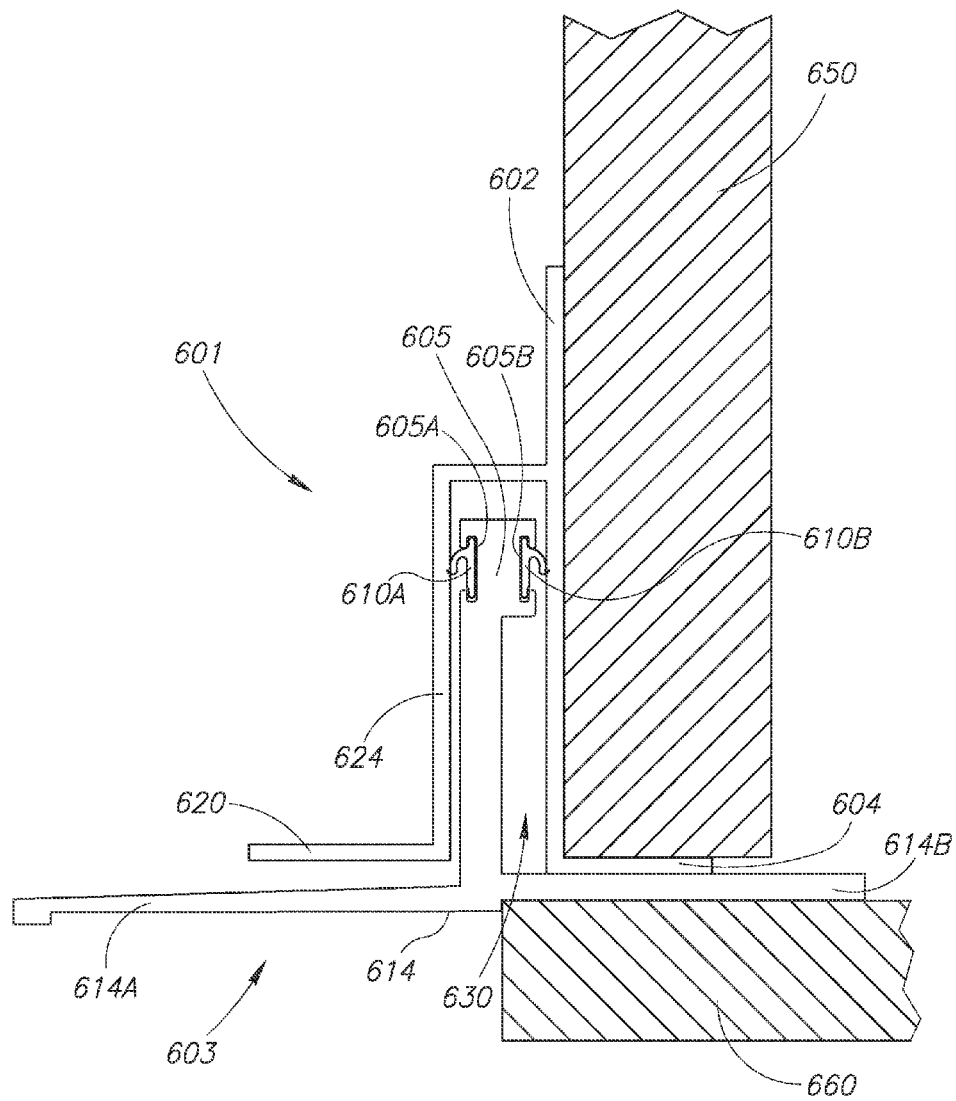
FIG. 6D is a sectional view of the horizontal panel joint shown in FIG. 6A.

The T-stop extrusion 603 may be mounted to a top surface of cladding 660 (see FIG. 6D) by a dry-side horizontal mounting flange portion 614B of a horizontal flange 614. The vertical male extension 616 includes a gasket engagement portion 605 having front and back gasket receiving portions or slots 605A and 605B, respectively, for receiving respective gaskets 610A and 610B (see FIGS. 6A and 6C). In some embodiments, two gaskets are used, including one water seal (e.g., the gasket 610A) and one air seal (e.g., the gasket 610B). The use of the two gaskets 610A and 610B ensures that proper pressure is maintained while not allowing moisture past the joint 600. FIG. 6D is a sectional view of the two gaskets 610A and 610B in position inside the female pocket 630 of the female extrusion 601. The T-stop extrusion 603 also comprises an exterior facing drainage flange portion 614A of the horizontal flange 614. The exterior facing drainage flange portion 614A may be sized to fit various usage configurations as desired. As can be appreciated, the configurations may vary with different depths of insulation or the depth of the cavity system.

Referring back to FIG. 4, a notch 525 is formed in the bottom portion of the mounting flange 524 of the male extrusion 501 so that the vertical joint 500 maybe interlocked with the h-extrusion 602 of the horizontal joint 600. A similar notch (not shown) is present in the bottom portion of the mounting flange 528 of the female extrusion 507. In FIG. 4, the vertical extension 616 is shown with the h-extension 602 removed therefrom for clarity.

FIGS. 7A-7G illustrate various installation conditions in which the vertical panel joints described herein may be implemented. Like the vertical panel joint 500 shown in FIGS. 5A-5D, each of the vertical panel joints shown in FIGS. 7A-7G comprises a male extrusion and a female extrusion interlocked together. Throughout FIGS. 7A-7G, the female extrusions are shown mounted on cladding 701 (on the left side of each figure) and the male extrusions are shown mounted on cladding 703 (on the right side of each figure). The cladding 701 and 703 may be the same or different types of any suitable cladding material.

Figure 7A:
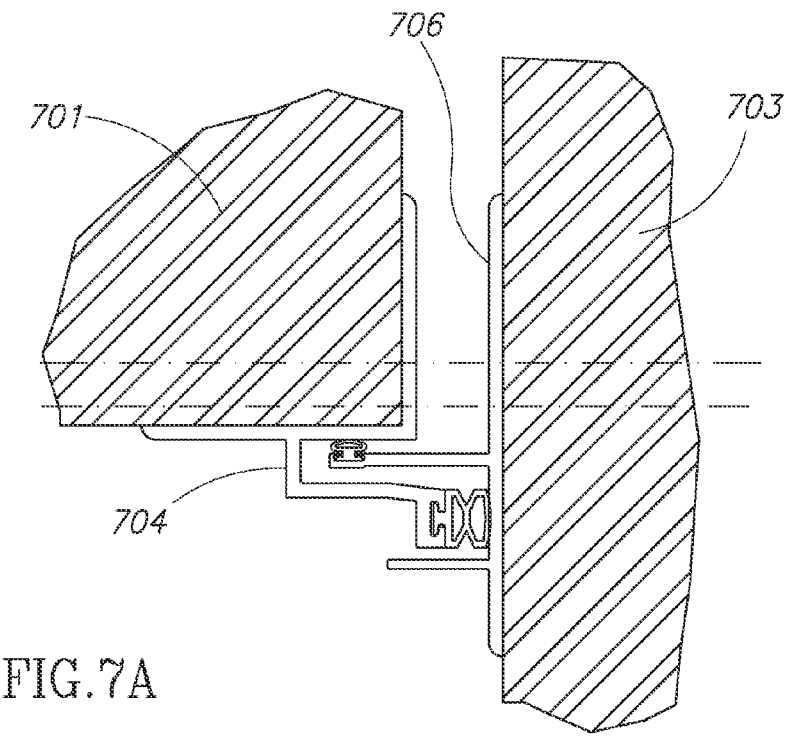
FIG. 7A is a top plan view of a vertical panel joint having a front flange female extrusion and a front flange male extrusion.
Figure 7B:
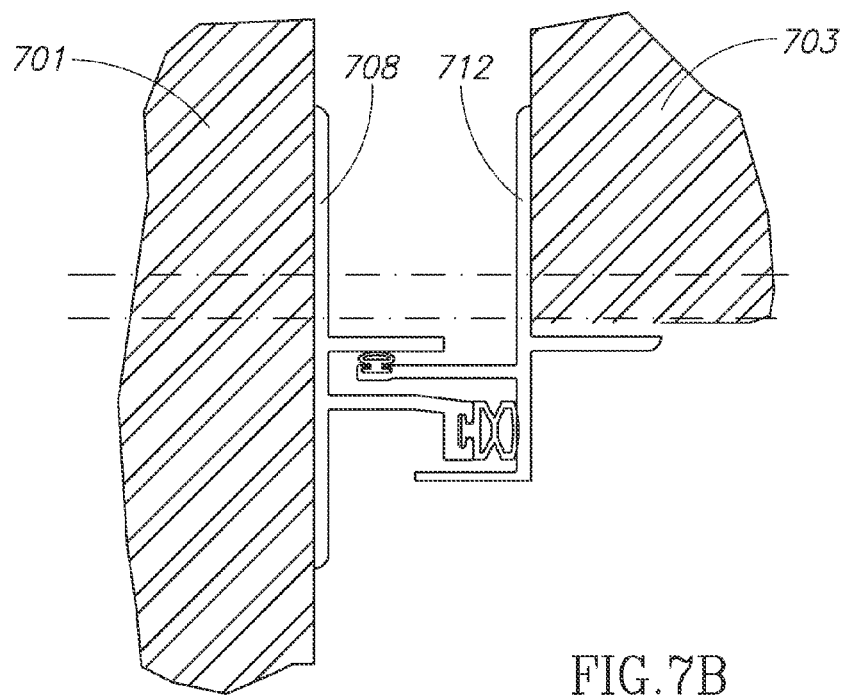
FIG. 7B is a top plan view of a vertical panel joint having a center flange female extrusion and a center flange male extrusion.
Figure 7C:
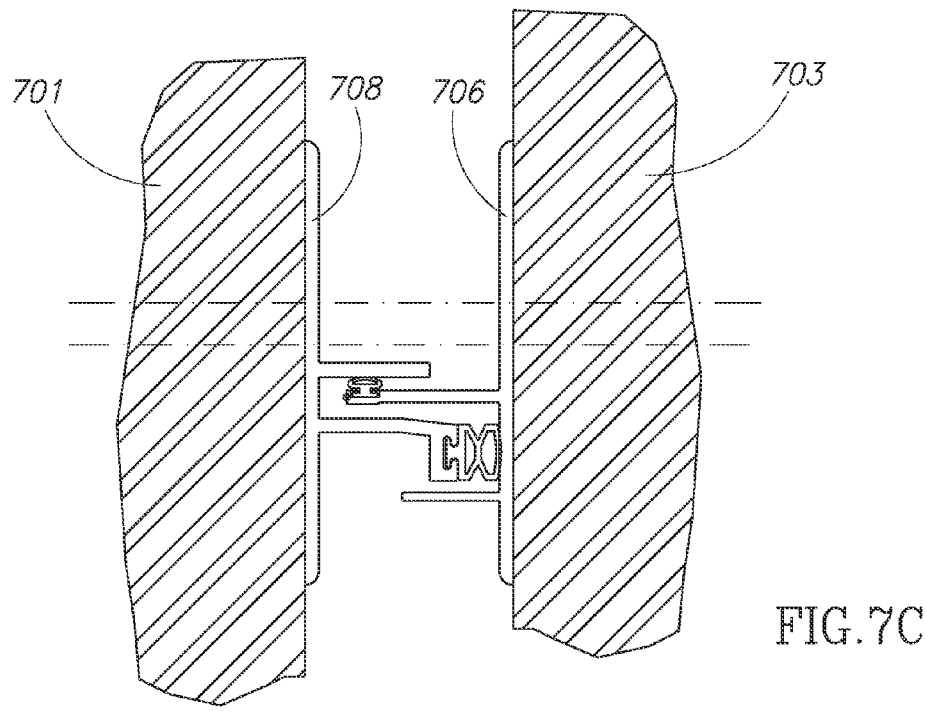
FIG. 7C is a top plan view of a vertical panel joint having a center flange female extrusion and a center flange male extrusion.
Figure 7D:
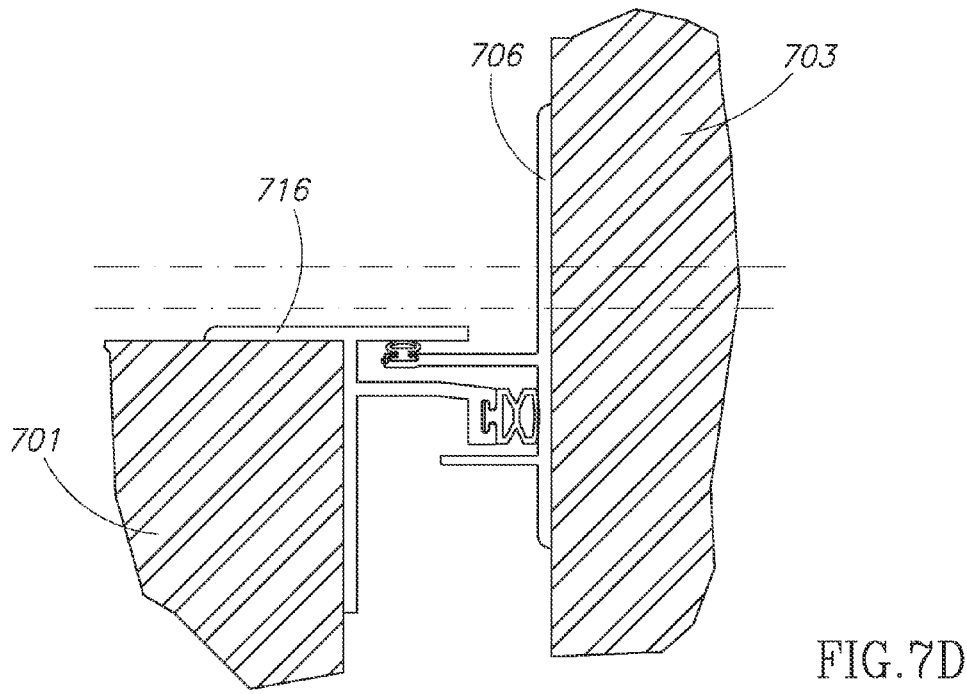
FIG. 7D is a top plan view of a vertical panel joint having a back flange female extrusion and a center flange male extrusion.
Figure 7E:
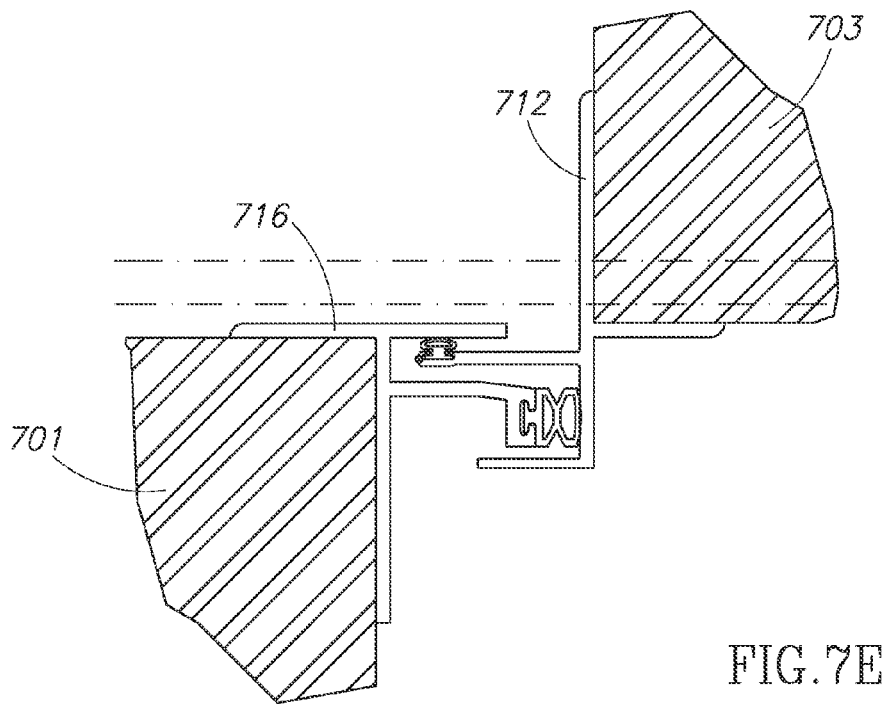
FIG. 7E is a top plan view of a vertical panel joint having a back flange female extrusion and a front flange male extrusion.
Figure 7F:
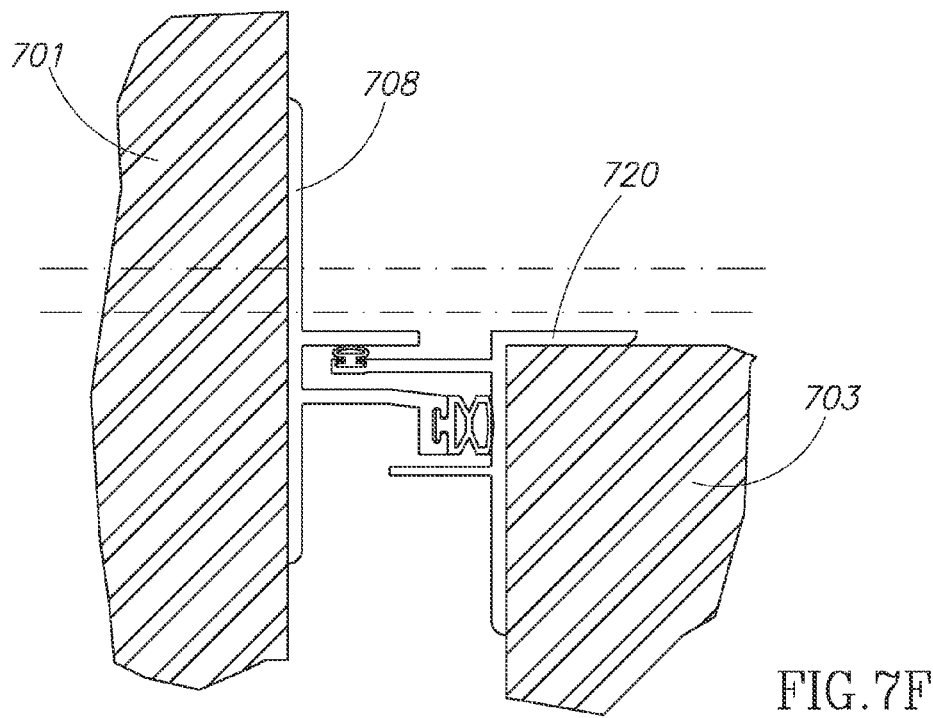
FIG. 7F is a top plan view of a vertical panel joint having a center flange female extrusion and a back flange male extrusion.
Figure 7G:
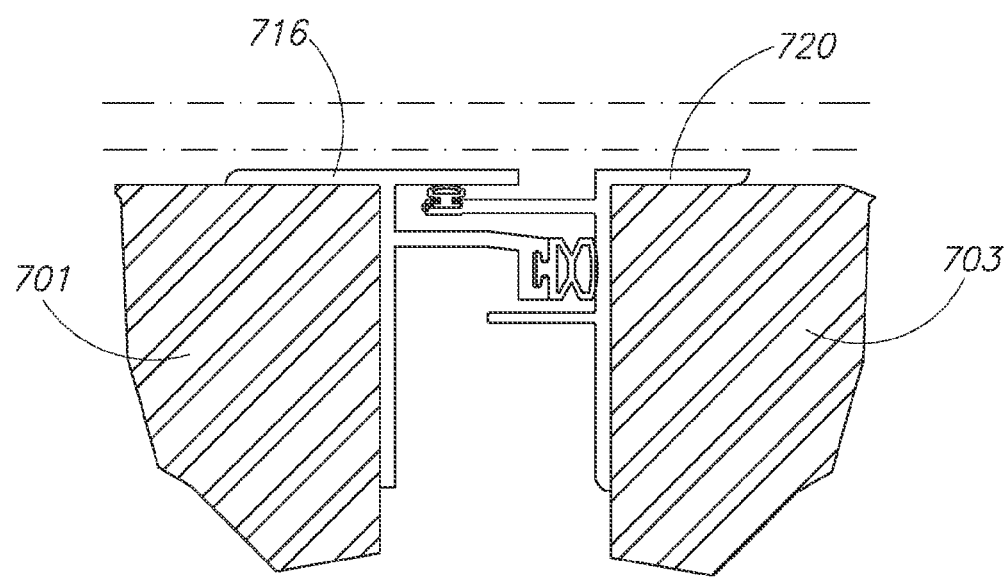
FIG. 7G is a top plan view of a vertical panel joint having a back flange female extrusion and a back flange male extrusion.

FIGS. 7A-7G illustrate various combinations of front facing flanges, back facing flanges, and center facing flanges for the male extrusions and female extrusions. Specifically, FIG. 7A is a top plan view of a vertical panel joint having a front flange female extrusion 704 and a center flange male extrusion 706. FIG. 7B shows a vertical panel joint having a center flange female extrusion 708 and a front flange male extrusion 712. FIG. 7C shows a vertical panel joint having the center flange female extrusion 7C and the center flange male extrusion 706. FIG. 7D shows a vertical panel joint having a back flange female extrusion 716 and the center flange male extrusion 706. FIG. 7E shows a vertical panel joint having the back flange female extrusion 716 and the front flange male extrusion 712. FIG. 7F shows a vertical panel joint having the center flange female extrusion 708 and a back flange male extrusion 720. FIG. 7G shows a vertical panel joint having the back flange female extrusion 716 and the back flange male extrusion 720.

FIG. 8 is a top plan view of another embodiment of a vertical panel joint 800 having a forward facing flange male extrusion 802 mounted on cladding 806 (e.g., a curtain wall) and a rear facing flange female extrusion 804 mounted on cladding 812 (e.g., wall framing). In this example, a layer of insulation 818 is provided adjacent the cladding 812, and a brick veneer 814 is also included. The dashed lines 834 represent a sill closure (not shown) that is positioned below the vertical joint 800 and cladding panels 806 and 812. In this embodiment, the extrusions 802 and 804 are mounted to the cladding 806 and 812, respectively, using anchors 830 that are each driven into the cladding material. Additionally, thin layers of self-adhered membranes (SAM) 824 and 820 are positioned between the extrusions 802 and 804 and the respective cladding 806 and 812. The SAM layers 820 and 824 may be provided to isolate the cladding 812 and 814 from the extrusions 802 and 804. This may be desired, for example, in cases where the cladding 812 and 814 is a material such as concrete and the extrusions 802 and 804 are formed from aluminum. SAM layers 822 and 826 are also provided over the mounting flanges 804 and 802, respectively.

Figure 9:
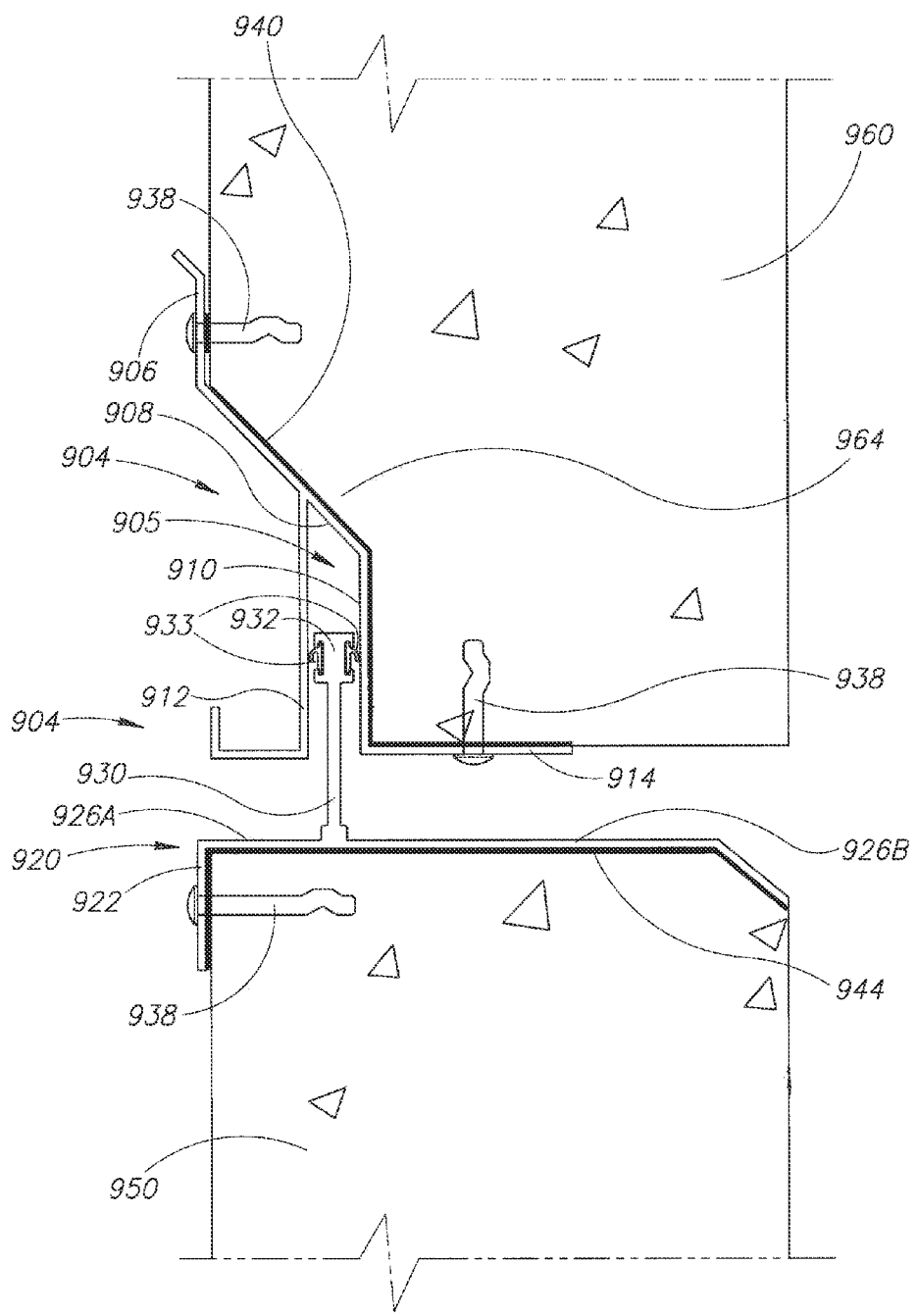
FIG. 9 is an elevational view of another embodiment of a horizontal panel joint having an h-extrusion and a T-stop extrusion.

FIG. 9 is an elevational view of another embodiment of a horizontal drainage joint 900 having an h-extrusion 904 coupled to cladding 960 (e.g., a precast concrete panel) and a T-stop extrusion 920 coupled to a top surface of cladding 950 (e.g., a poured concrete curb or a precast concrete panel). The horizontal joint 900 is similar in several respects to the horizontal joint 600 illustrated in FIGS. 6A-6D. In this embodiment, the cladding 960 includes an angled cut portion 964 shaped to accommodate the h-extrusion 904. The h-extrusion 904 includes a vertical upper mounting flange 906, an angled mounting flange 908, a vertical lower mounting flange 910, and a horizontal rearward facing mounting flange 914. The h-extrusion 904 is secured to the cladding 960 by anchors 938 that are driven through the mounting flanges and into the cladding 960. A SAM layer 940 is also positioned between the h-extrusion 904 and the cladding 960 to isolate the two components from each other.

The T-stop extrusion 920 comprises a vertical extension member 930 extending upward into a female pocket 905 formed in the h-extrusion 904. Similar to the vertical extension member 616 discussed above, the uppermost portion of the vertical extension member 930 comprises a gasket engagement portion 932 configured to support gaskets 933. The T-stop extrusion 920 comprises a horizontal exterior mounting flange 926A, a horizontal interior mounting flange 926B, and a vertical exterior mounting flange 922. The T-stop extrusion 920 is secured to the cladding 950 by anchors 938 that are driven through the mounting flanges into the cladding 950. A SAM layer 944 is also positioned between the T-stop extrusion 920 and the cladding 950 to isolate the two components from each other.

Accordingly, it should be appreciated that the universal joint systems describe herein substantially reduce the chance for installation error and reduce susceptibility from environmental factors that cause degradation, without sacrificing performance. The joint systems are highly UV resistant and comprise redundant mechanical advantage drainage solutions. Further, the joint systems are ideal for rain-screen utilization or pre-cast/pre-assembled panels with deep system drainage requirements. The disclosed joint systems may function as a long term solution to tying together different vertical façade systems such, as but not limited to, pre-cast to glass curtain-wall, storefront to brick veneer cavity wall, strip window to curtain-wall, and natural stone rain-screen to cast in place concrete. Generally, the joint systems described herein may be used to adjoin one or more types of cladding materials including, but not limited to, rain screen fiber composition panels (FCP), rain-screen fiber reinforced plastic (FRP) panels, rain-screen brick, glass curtain-walls, glass storefronts, glass strip windows, metal panels, profile metal panels, poured in place concrete, pre-cast concrete, natural stone rain-screen panels, aluminum plate panels, aluminum composite panels, or other suitable cladding.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A joint system for providing a seal between a first cladding and a second cladding, the joint system comprising:
   a female extrusion comprising a mounting flange configured to permit coupling to a surface of the first cladding, the female extrusion further comprising an extension arm, and a pocket formed between the mounting flange and the extension arm;
   a first self-adhered membrane layer disposed between the mounting flange of the female extrusion and the first cladding;
   a male extrusion comprising a mounting flange configured to permit coupling to a surface of the second cladding, the male extrusion further comprising an extension arm sized to be received within the pocket of the female extrusion when the first cladding is positioned proximate to the second cladding, the extension arm of the male extrusion comprising a gasket attached thereto; and
   a second self-adhered membrane layer disposed between the mounting flange of the male extrusion and the second cladding;
   wherein, when the extension arm of the male extrusion is positioned within the pocket of the female extrusion, the gasket contacts an interior surface of the pocket of the female extrusion to form a seal between the first cladding and the second cladding.

2. The joint system of claim 1 wherein the male extrusion further comprises an exterior shield flange disposed toward an exterior side of the extension arm of the male extrusion, and the extension arm of the female extrusion includes a rain-screen gasket coupled thereto that is adjacent to the exterior shield flange when the first cladding and the second cladding are positioned proximate to each other to provide an initial seal behind the exterior shield flange.

3. The joint system of claim 2, further comprising a butyl sealant applied within the pocket of the female extrusion.

4. The joint system of claim 1, wherein the first cladding and the second cladding each comprises one or more of the following materials: rain screen fiber composition panel (FCP), rain-screen fiber reinforced plastic (FRP) panel, rain-screen brick, glass curtain-wall, glass storefront, glass strip window, metal panel, profile metal panel, poured in place concrete, pre-cast concrete, natural stone rain-screen panels, aluminum plate panel, and aluminum composite panel.

5. The joint system of claim 1, wherein the mounting flange of the female extrusion is configured for mounting the female extrusion in one of a front facing configuration, a back facing configuration, and a centered configuration, and the mounting flange of the male extrusion is configured for mounting the male extrusion in one of a front facing configuration, a back facing configuration, and a centered configuration.

6. The joint system of claim 1, wherein the female extrusion and the male extrusion are configured for mounting to vertical surfaces of the first cladding and the second cladding, respectively.

7. The joint system of claim 1, wherein the female extrusion and the male extrusion are configured for mounting to horizontal surfaces of the first cladding and the second cladding, respectively.

8. The joint system of claim 7, wherein the female extrusion comprises an exterior facing horizontal flange configured for directing water outward toward the exterior.

9. The joint system of claim 8, wherein the male extrusion comprises a horizontal exterior facing drainage flange.

10. The joint system of claim 1, wherein the male extrusion and the female extrusion are made from aluminum.

11. The joint system of claim 1, wherein at least one of the female extrusion and the male extrusion are mountable on a corner of the first cladding and the second cladding, respectively.

12. The joint system of claim 1, wherein the female extrusion is pre-cast with the first cladding during formation of the first cladding.

13. The joint system of claim 1, wherein the female extrusion and the male extrusion are couplable to the first cladding and the second cladding, respectively, by anchors that are driven through the respective mounting flanges into the respective first cladding and second cladding.

14. A joint system for providing a seal between a vertical surface of a first cladding and a vertical surface of a second cladding, the joint system comprising:
   a female extrusion comprising a mounting flange configured to permit coupling to the vertical surface of the first cladding, the female extrusion further comprising an extension arm extending in a direction toward the second cladding and having a rain-screen gasket coupled to an free end thereof, wherein a pocket of the female extrusion is formed between the mounting flange and the extension arm; and
   a male extrusion comprising a mounting flange configured to permit coupling to the surface of the second cladding, an elongated extension arm extending outward from the mounting flange of the male extrusion in a direction toward the first cladding and comprising a gasket coupled to a free end thereof, the male extrusion further comprising an exterior shield flange disposed toward an exterior side of the elongated extension arm;
   wherein, when the first cladding is positioned substantially adjacent to the second cladding, the elongated extension arm of the male extrusion is positioned within the pocket of the female extrusion and the rain-screen gasket is positioned adjacent to the exterior shield flange, thereby forming a seal between the first cladding and the second cladding.

15. The joint system of claim 14, further comprising a butyl sealant applied between the rain-screen gasket and the exterior shield flange.

16. The joint system of claim 14, wherein the first cladding and the second cladding each comprises one or more of the following materials: rain screen fiber composition panel (FCP), rain-screen fiber reinforced plastic (FRP) panel, rain-screen brick, glass curtain-wall, glass storefront, glass strip window, metal panel, profile metal panel, poured in place concrete, pre-cast concrete, natural stone rain-screen panels, aluminum plate panel, and aluminum composite panel.

17. A joint system for providing a seal between a bottom surface of a first cladding and a top surface of a second cladding, the joint system comprising:
   a female extrusion comprising a mounting flange configured to permit coupling to the bottom surface of the first cladding, and further comprising a downward facing pocket;
   a butyl sealant applied within the socket of the female extrusion; and
   a male extrusion comprising a mounting flange configured to permit coupling to the top surface of the second cladding, and further comprising an elongated extension arm extending upward from the mounting flange, the elongated extension arm comprising a gasket coupled to a free end thereof;
   wherein, when the first cladding is positioned substantially adjacent to and on top of the second cladding, the elongated extension arm of the male extrusion is positioned within the pocket of the female extrusion to form a seal between the first cladding and the second cladding.

18. The joint system of claim 17, wherein the first cladding and the second cladding each comprises one or more of the following materials: rain screen fiber composition panel (FCP), rain-screen fiber reinforced plastic (FRP) panel, rain-screen brick, glass curtain-wall, glass storefront, glass strip window, metal panel, profile metal panel, poured in place concrete, pre-cast concrete, natural stone rain-screen panels, aluminum plate panel, and aluminum composite panel.

19. The joint system of claim 17, wherein the female extrusion comprises an exterior facing horizontal flange extending outward from the pocket for directing water outward toward the exterior.

20. The joint system of claim 19, wherein the male extrusion comprises a horizontal exterior facing drainage flange.

21. The joint system of claim 17, further comprising a first self-adhered membrane layer disposed between the mounting flange of the female extrusion and the first cladding and a second self-adhered membrane layer disposed between the mounting flange of the male extrusion and the second cladding.

22. The joint system of claim 17, wherein the male extrusion and the female extrusion are made from aluminum.

23. The joint system of claim 17, wherein the female extrusion is pre-cast with the first cladding during formation of the first cladding.

24. A joint system for providing a seal between a bottom surface of a first cladding and a top surface of a second cladding, the joint system comprising:
   a female extrusion comprising a mounting flange configured to permit coupling to the bottom surface of the first cladding, and further comprising a downward facing pocket;
   a first self-adhered membrane layer disposed between the mounting flange of the female extrusion and the first cladding;
   a male extrusion comprising a mounting flange configured to permit coupling to the top surface of the second cladding, and further comprising an elongated extension arm extending upward from the mounting flange, the elongated extension arm comprising a gasket coupled to a free end thereof; and
   a second self-adhered membrane layer disposed between the mounting flange of the male extrusion and the second cladding;
   wherein, when the first cladding is positioned substantially adjacent to and on top of the second cladding, the elongated extension arm of the male extrusion is positioned within the pocket of the female extrusion to form a seal between the first cladding and the second cladding.

25. The joint system of claim 24, wherein the first cladding and the second cladding each comprises one or more of the following materials: rain screen fiber composition panel (FCP), rain-screen fiber reinforced plastic (FRP) panel, rain-screen brick, glass curtain-wall, glass storefront, glass strip window, metal panel, profile metal panel, poured in place concrete, pre-cast concrete, natural stone rain-screen panels, aluminum plate panel, and aluminum composite panel.

26. The joint system of claim 24, wherein the female extrusion comprises an exterior facing horizontal flange extending outward from the pocket for directing water outward toward the exterior.

27. The joint system of claim 24, wherein the male extrusion comprises a horizontal exterior facing drainage flange.

28. The joint system of claim 24, wherein the male extrusion and the female extrusion are made from aluminum.

29. The joint system of claim 24, wherein the female extrusion is pre-cast with the first cladding during formation of the first cladding.

* * * * *